United States Patent Office 3,549,661
Patented Dec. 22, 1970

3,549,661
METHOD OF MANUFACTURING CHEMICALLY PURE FLAVANEDIOLS
Jacques Masquelier and Jean Michaud, Bordeaux, Gironde, France, assignors to Societe: Societe Civille de Recherche Pharmaceutique et Therapeutique, Bordeaux, Gironde, France, a corporation of France
No Drawing. Filed July 31, 1968, Ser. No. 748,960
Claims priority, application France, Aug. 2, 1967, 116,632; Oct. 30, 1967, 126,402
Int. Cl. C07d 7/20
U.S. Cl. 260—345.2    7 Claims

ABSTRACT OF THE DISCLOSURE

The invention relates to the synthetic preparation of chemically pure flavanediols by treating flavanonols previously directly reduced by sodium borohydride, with an aqueous solution of sodium chloride and adding water to form the desired hydrate. These flavanediols are useful in medicinal preparations.

In the following description, the general term of proanthocyanidols, has been applied to the group of flavanediols-3,4, each one of which can also be named according to the anthocyanin which it forms through the action of acids: for example, procyanidol leads to cyanidol, propelargonidol, leads to pelargonidol, a.s.o.

It has already been suggested to prepare flavanediols through reduction of the corresponding flavanonols. In the case of flavanediol or tetrahydroxy-5,7,3',4' flavanediol-3,4, the starting material is tetrahydroxy-5,7,3',4' flavanone-4 ol-3 which is reduced in accordance with the reduction scheme:

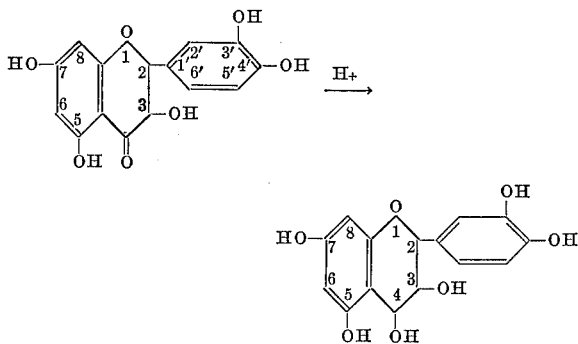

A number of bibliographical references of prior art are mentioned hereafter to indicate the technical knowledge in this field, in particular for the preparation of flavanediol.

A certain number of known processes suggest the reduction of flavanonols by catalytic hydrogenation. These processes are described, for example, in the articles by R. Mozingo and H. Adkins [J. Amer. Chem. Soc., (1938), 60, 669–675] and R. Bognar and M. Rokasi [Chem. Ind. (1956), 188 Acte Chim. Acad. Sci. Hung. (1958), 14, 369–379] and make it possible to obtain in small quantities the non-hydroxylated flavanediol-3,4, by starting from the corresponding flavanonol. Reference may also be made to the articles by K. Freudenberg and D. K. Roux [Naturvissenschaften, (1954), 41, 450] as well as by K. Freudenberg and K. Weinges [Ann. (1958) 613, 61] which more particularly relate to the reduction of dihydroquercetol or taxifoliol. In the references just mentioned, the formation of flavanediol remains uncertain and raises, to say the least, great difficulties.

Another group of processes of the prior art employs metallic hydrides as reducing agents for flavanonols. A pertinent bibliographical reference in this respect is the article by K. Freudenberg and K. Weinges [Angew. Chem. (1958), 70, 51]. This article mentions the preparation and certain physical properties of leucocyanidol hydrate or hydrate 3,4,5,7,3'-4'-hexahydroxy-flavan, which can be obtained in crystallized form. This method of hydrogenation starting from ketone compounds in order to obtain crystallizable hydroxy compounds requires, however, great care, as reported by the authors. Indeed, it is difficult to reduce flavanonols having a hydroxyl group at position 5 as is the case for taxifoliol. This difficulty might be due to a bond (seen in the I.R. spectrum) between the ketone group at position 4 and the hydroxyl group at position 5. The authors, therefore, suggest to use the route through the taxifoliol tetrabenzoyl ester. The benzoyl groups are then removed by catalytic hydrogenation. But in this case, also, a too strong reduction leads to a catechol (d,1-catechol and d,-catechol). Such a process, remains thus uncertain and leads, in the best of cases, to very low flavanediol yields.

Another class of processes of the prior art makes use of sodium borohydride as a reducing agent. For example, T. Swain [Chem. Ind. (1954), 1144–5] describes the reduction of taxifoliol with sodium borohydride and obtains a non-crystalline compound melting at 240° C. with decomposition. In an atricle, L. L. Creasy and T. Swain [Nature, G. B. (1965), 208, 151–153] discuss the structure of the product obtained using such a reduction.

In the same line of thought, the article by K. Freudenberg et al., mentioned above [Angew. Chem., (1958), 70 51] shows that the reduction of taxifoliol with sodium borohydride leads to a complex from which flavanediol may be recovered only through the action of a strong acid. Under these conditions, polymerization occurs and thus the monomer should not be obtained through this route. In another bibliographical reference, where the proceedings are carefully described, A. K. Ganguly and T. R. Seshadri [Tetrahedron (1959), 6, 21–23] emphasize that leucocyanidol cannot be obtained in the pure state by reducing taxifoliol with sodium borohydride. These latter authors suggest, to avoid this difficulty, the reduction of taxifoliol tetramethyl ether in order to obtain flavanediol esters, such as the hexa-acetate, which are more stable. Alternatively, taxifoliol is directly reduced, using sodium borohydride, but the reaction product, unable to yield crystallized flavanediol, is directly acetylated with a view to separate the acetylated derivative.

This brief survey of the prior knowledge shows that reduction of flavanonols to flavanediols is difficult to apply in practice. Thus, due to several possible stages of oxidation of these molecules, it is difficult to limit the action of hydrogen to the desired stage, and when using no precautions, more highly reduced products, such as catechol, are obtained. Furthermore, the presence of a hydroxyl group at position 4, which is very reactive, enhances the formation of polymers through chain condensation on the phloroglucinol ring of another molecule. Thus, in reaction media where monomeric flavanediol has been successfully produced, extraction of the latter leads to insoluble polymers which are finally oxidized to more or less colored products. Finally, processes of the prior art, which describe the preparation and purification of crystallized monomeric flavanediol are not easily reproducible and lead to uncertain results. These research procedures which often use preparative chromatography, are completely unusable industrially, on the one hand, because of their high price and very low yield, and on the other hand, because of their ambiguous or random results.

As a result of their own investigations applicants have found that when the residue from the reduction of taxifoliol is taken up with a saturated solution of sodium chloride in slightly acetic acid or neutral medium, and when crystallization of the monomer is effected in the presence of a certain quantity of water present in a mixture of ethyl acetate and chloroform, it then becomes possible to obtain crystallize flavanediol through direct reduction of taxifoliol with a borohydride without going through the corresponding esters. Furthermore, in the course of these investigations, applicants have noted that for the reduction described, it is possible to use, not only sodium borohydride, but also alkaline borohydrides, such as potassium borohydride or ametal borohydrides, such as potassium borohydride or a metallic hydride, or other reducing agents, preferably chosen so as to have properties analogous to those of the borohydrides.

The invention, therefore, relates to a chemical process for the preparation, which actually corresponds to a synthesis, of crystallized chemically pure flavenediols. It also relates to the new flavanediols obtained through reduction of flavanonols.

The invention relates more particularly to a new drug based on pure flavanediol and, in particular, to a drug for the treatment of venous, vascular and capillary affections and of the various morbid states which may be attributed to P (or $C_2$) avitamonosis, said drug containing as active principle, monomeric leucocyanidol, i.e., tetrahydroxy-5,7,3',4'-flavanediol-3,4 whose structural formula is as follows:

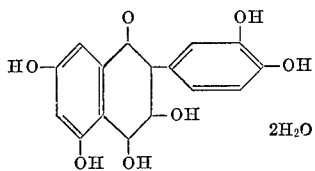

2H$_2$O

The method according to the invention, designed to obtain pure crystallized flavanediol by direct reduction of flavanonols with sodium borohydride, is characterized in that, after reduction in alcohol medium, the reaction product is taken up in a saturated aqueous solution of sodium chloride, in neutral or slightly acetic acid medium, and the solution thus obtained is then extracted with an immiscible solvent, for example ethyl acetate, so as to extract the corresponding flavanediol and said flavanediol is then precipitated from chloroform after adding to the ethyl acetate extract, for example, a certain quantity of water to form the hydrate of said flavanediol.

According to another embodiment of the invention, a saturated solution of sodium chloride at a pH ranging from 4 to 7 is preferably used to take up the reaction residue, which leads to the decomposition of the boron complex without inducing polymerization.

As far as crystallization of the monomeric flavanediols is concerned, it is carried out, for example, in a mixture of ethyl acetate and chloroform, but advantageously in the presence of the exact quantity of water necessary for the formation of the flavanediols hydrate, which is insoluble in this medium.

The method according to the invention makes it possible to obtain numerous flavanediols which differ only through R and R' substitutions on the benzene ring adjacent to the pyrene ring according to the following general reaction:

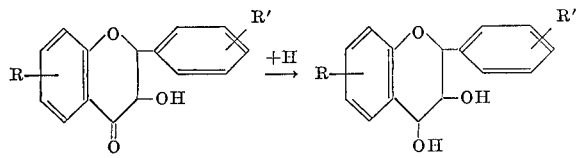

Two examples have been described below relating to the application of the process of the invention with respect to two different flavanediols.

EXAMPLE 1

Preparation of flavanediol which is the drug according to the invention. The synthesis of the active principle of the drug according to the invention, consists fundamentally, after direct reduction of tetrahydroxy-5,7,3',4' flavanonol-3 to tetrahydroxy-5,7,3',4' flavanediol-3,4 with sodium borohydride in an alcoholic mixture, in evaporating the reaction mixture to dryness under reduced pressure after acidification, taking up the residue in a saturated aqueous solution of sodium chloride, extracting the flavanediol formed with an immiscible solvent such as ethyl acetate and in subsequently precipitating it with chloroform, benzene, petroleum ether, hexane, etc., after having added the necessary quantity of water to form the flavanediol hydrate insoluble in the precipitating solvent.

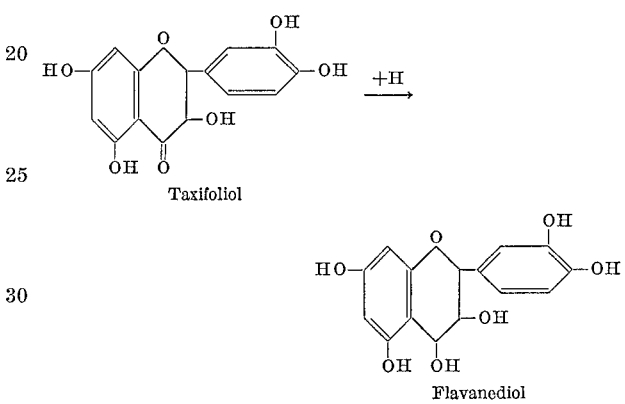

1 g. of taxifoliol (tetrahydroxy-5,7,3',4' flavanonol-3) was dissolved in 400 ml. of methanol. The solution was cooled to approximately 0° C. 4 g. of sodium borohydride were added and then it was allowed to stand at room temperature for a period of time ranging from 4 to 48 hours. 12 ml. of crystallizable acetic acid was then added and the solution was evaporated to dryness under reduced pressure at a temperature below 30° C. The residue was taken up in 100 ml. of a saturated solution of sodium chloride. This salt solution was extracted with four 50 ml. portions of ethyl acetate. The other fractions were combined and then dried over dry sodium sulfate and finally filtered. They were concentrated under reduced pressure at a temperature below 30° C., to a volume of 100 ml. Approximately 10 drops of water were added and the procyanidol was precipitated with one liter of chloroform. The mixture containing the suspended precipitate was placed in a refrigerator for several hours, and then filtered using a previously cooled apparatus to avoid any warming up during filtration. The chloroform held by this precipitate was rapidly blown off by aeration.

The product thus prepared contains a small quantity of unreacted taxifoliol. In order to purify it, one can dissolve it in 20 ml. of an alcohol, such as methanol, add a pinch of adsorbent black, after which it may be filtered and, after adding 20 ml. of water, the resulting mixture can be evaporated under reduced pressure to a volume or approximately 10 ml. This aqueous solution, when allowed to stand for 24 hours in the refrigerator, gives a yield of the order of 50 per 100 of pure crystallized flavanediol as colorless needles, based on initial taxifoliol.

Identification 100 mg. of the product dissolved in 5 ml. of water to which was added 1 ml. of concentrated hydrochloric acid were heated on the steam bath for 20 minutes. An intense current red coloration was formed which could be extracted with one ml. of isoamyl alcohol. Paper chromatography using the Forestal mixture (concentrated hydrochloric acid—acetic acid, water 3/30/10) proved it to be cyanidol (Rf=0.50).

Paper chromatography of the synthetic flavanediol, in 2% acetic acid, after development, using the p-toluene-sulfonic acid/vanillin reagent, showed a bright red well-defined spot of Rf=0.48, without any trails of lower Rf (absence of polymers).

Using the same butanol-acetic acid-water solvent (4/1/2.2) and with the same developer, its Rf was 0.61.

The synthetic compound was obtained as colorless microcrystalline needles, soluble in water and alcoholic solvents, insoluble in ether, petroleum ether, benzene and chloroform.

The identification of this monomeric compound is easy when using the specific reaction for hydroxyflavanediols, heating in the presence of a dilute inorganic acid, leads to their conversion to anthocyanins and the determination of this anthocyanin by paper chromatography and measurement of the wavelength of the absorption maximum, makes it possible to characterize the proanthocyanin from which they are derived.

Flavanediol yields cyanidol (Rf=0.50 in the Forestal solvent $\lambda_{max}$=540 m$\mu$ dissolved in isoamyl alcohol). Furthermore, direct chromatography of the synthetic flavanediol, using a 2% acetic acid solution makes it possible to differentiate it from catechols and closely similar products, on the one hand, through their difference in Rf and, on the other hand, through the colors obtained with certain indicator reagents. The following table indicates these differences:

| | Acetic acid | Partridge solvent | p-Toluene-sulfonic acid | Vanillin reagent |
|---|---|---|---|---|
| (+)Catechol | 0,42 | 0,70 | Purplish-brown. | Orange pink. |
| (−) Epicatechol | 0,35 | | Purplish-brown. | Orange pink. |
| Flavanediol | 0,48 | 0,65 | Pink | Pink. |

Flavanediol does not have a sharp melting point. However, the melting point of its hexa-acetylated derivative can be measured which is 142–144° C. Identification of the drug according to the invention: as just described for the flavanediol.

The P antivitaminic role of the flavane polymers is known (Parrot and Cotereau, Comptes Rendus, Société de Biologie (1949) 139, 1051).

It was therefore particularly valuable to have a product possessing maximum vitamin P activity. However, tests relating to the extraction of monomeric flavanediol from natural products have not, in fact, provided a solution to the problem: under the influence of various factors, traces of acidity and oxygen in particular, there is a rapid polymerization of the molecule and vitamin P antagonistic activities appear. In practice, hydroxyflavanediols exist in nature, in particular, in fruits and vegetables. A normal diet should then yield a sufficient number of P factors to prevent any deficiency. But these ingredients (and in general all bioflavonoids), are most often located in barks, teguments, cuticles and the ligneous parts of plants, so that they are eliminated upon consumption of fruits and vegetables. It is therefore not surprising to see individuals showing disturbances which may be attributed to a P factor deficiency in spite of a well balanced food diet. In addition, numerous natural bioflavonoids are very slightly soluble or even insoluble in water. It can therefore be appreciated that they show a low activity when absorbed with foods.

It has namely been observed that use of natural flavanediols was efficient against disturbances due to a P avitaminosis. But the difficulty and even the impossibility of effectively and actually isolating flavanediols up to now in pure and crystallized monomeric form from vegetable products, has led to the fact that only complex compounds showing a reduced activity due to the presence of antagonistic polymers have been available up to now.

The active principle according to the invention, pure and crystallized monomeric flavanediol, meets the requirements necessary to insure the optimum vitamin P action which has been looked for up to now; it possesses, by itself, to a high degree and without any unfavorable secondary actions all the therapeutic indications of the bioflavanoids or vitamin P factors. Said active principle, therefore, in fact makes up vitamin P (or $C_2$) which, according to the invention, has been isolated for the first time and in sufficient quantities to check and observe its vitaminic properties.

The therapeutic indications mentioned above may be classified into four groups:

(1) Action on capillaries and vessels (a) Capillary fragility.—Tendency towards ecchymosis, vascular disturbances in hypertensive subjects, diabetic retinopathy, capillary fragility in renal insufficiencies, heptatic insufficiency and infectious disease. Hemorrhoidal attacks, prevention of capillary fragility during treatment with anti-coagulants.

(b) Abnormally high capillary permeability.—Leg edemas, "heavy legs." Varicosis, varicose ulcers, after-effects of phlebitis, edemas in premature subjects, edema in hepatic insufficiencies, pleural effusions in cardiac subjects, pleuritis, periarthritis, allergic accidents (urticaria, eczema, Quincke's edema, diahydrosis, dermatosis (Pemphigus, psoriasis), cellulitis.

The action of flavanediol on capillaries and vessels has been verified: when injected intraperitoneally to Guinea-pigs, at a dose of 5 to 10 mg./kg., an increase in capillary resistance is observed within the twelve following hours, from approximately 20 to 50 cm. of mercury. It then drops after 48 hours and then settles down again at a high level after 72 hours. This two-phase phenomenon is in all respects identical with that obtained using catechol in similar doses (5 to 15 mg./kg.). This action, as is known, is much stronger than that of bioflavonoids among which, for example, rutoside is active at high doses only of up to 1 g./kg. and shows only a single-phase beginning action without any secondary level.

(2) Vitamin C metabolism

As soon as the first studies were carried out on bioflavonoids, Randoin and Lecoq (1927) had differentiated two types of vitamin C deficiencies. The first one could be attributed to ascorbic acid (vitamin $C_1$) and the second one to a bioflavonoid (vitamin $C_2$). Later on, Szent-Gyorgyi emphasized the role of the permeability factor of these bioflavonoids, which led to the use of the same vitamin P. More recently, the complementary role played by bioflavonoids with respect to vitamin C was considered again. C. Parrot and Cotereau (Rev. Intern. Vitamin. (1937), 27, 345) have shown that substances of the catechol group were necessary for the antiscorbutic activity of ascorbic acid to be revealed.

The indications connected with this biological activity therefore corresponds to those of ascorbic acid. In this case, the role of flavanediol is to reinforce the action of vitamin C ($C_1$) by decreasing its elimination, leading to a higher storage level in the organism. Flavanediol, whether or not associated with vitamin C, can thus be used for its action on: Scurvy—general growth—bone and tooth growth — toxic and infectious syndromes — collagen (trophic action)—asthenias—anaphylactic shock.

It has been possible to establish this vitamin C metabolism on animals by saturating them orally with ascorbic acid. After several days, urine elimination of vitamin C increases considerably and then remains at a high level. When flavanediol is absorbed at this point, there is a large decrease in the renal excretion of vitamin C. It may be deduced that storage of vitamin C in the organism is raised to a higher level. This is confirmed by determination of this vitamin in the liver, brain, spleen, adrenal bodies of the sacrificed animals.

(3) Protective activity against radiation

Flavanediol plays an important role in cellular oxidation-reduction phenomena, in correlation with ascorbic acid. It was possible on animals to demonstrate experimentally the protective effect provided by bioflavanoids administered before or after total irradiation with X-rays (Brichzy et al. Strahlentherapie, Dtsch, 1962, 117, 265— Ershoff and Steers, Pro. Soc. exper. Biol. Med., U.S.A. 1960, 105, 283) or even before alpha radiation (Griffith and Couch, Chemistry section AAAS, New York, 1949, 552).

The new drug may be administered internally, externally or parenterally.

Internally (orally, rectally, etc.), it is possible, for example, to administer unit doses (tablets, sugar-coated pills, capsules, drinkable ampoules, suppositories, etc.) containing 5 to 50 mg. per dose, or solutions (drops, etc.) containing 1 to 10 per 100 of flavanediol.

The daily useful oral dosage may range from 5 to 200 mg. for adults and from 5 to 50 mg. for children.

Externally, the medicine may be used as an eyewash, skin cream, vaginal foam, toothpaste, masticating gum, etc. in concentrations of 1 to 10 per 100 of flavanediol.

Parenterally, doses of 5 to 100 mg. are administered daily.

Flavanediol can also be associated with other medicines such as ascorbic acid, antibiotics, sulfonamides, corticosteroids and cortico-adrenal extracts. For example, in association with ascorbic acid, the purpose of flavanediol, which acts as a metabolic factor, is to potentiate the activities of vitamin C by decreasing its elimination from the organism.

EXAMPLE 2

Preparation of leucopelargonidol

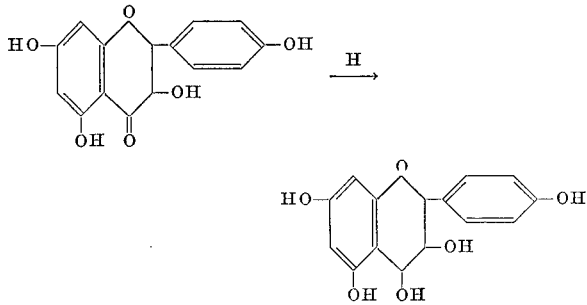

1 g. of aromadendrol (trihydroxy-5,7,4′ flavanonol-3) was dissolved in 400 ml. of methanol. The solution was cooled to approximately 0° C. 4 g. of sodium borohydride were added and the solution was let stand at room temperature for a period of time ranging from 4 to 48 hours. 12 ml. of crystallizable acetic acid were then added and the mixture was evaporated to dryness under reduced pressure at a temperature below 30° C. The residue was taken up in 100 ml. of a saturated solution of sodium chloride. This salt solution was extracted with four 50 ml. portions of ethyl acetate. The ether fractions were combined and then dried over dry sodium sulfate and finally filtered. They were concentrated under reduced pressure at a temperature below 30° C. to a volume of 100 ml. Approximately 10 drops of water were added and leucopelargonidol was precipitated with one liter of chloroform. The mixture containing the suspended precipitate was then placed in a refrigerator for several hours, then filtered using a previously cooled apparatus, so as to avoid any warming up during filtration. The chloroform held by this precipitate was rapidly blown off by aeration.

The product thus prepared contains a small quantity of unreacted aromadendrol. For its purification, it may be dissolved in 20 ml. of an alcohol, such as methanol, a pinch of adsorbent black can be added, after which it may be filtered and after adding 20 ml. of water, the resulting mixture can be evaporated under reduced pressure to a volume of approximately 10 ml. This aqueous solution, when allowed to stand for 24 hours in the refrigerator, gives a yield of pure crystallized leucopelargonidol as colorless needles of the order of 50 per 100 based on the initial aromadendrol.

Identification 100 mg. of the product dissolved in 5 ml. of water to which 1 ml. of concentrated hydrochloric acid has been added were heated on the steam bath for 20 minutes. An intense orange red coloration formed which could be extracted with 1 ml. of isoamyl alcohol. Paper chromatography using the Forestal mixture (see above) showed it to be pelargonidol ($Rf=0.68$).

Paper chromatography of the synthetic leucopelargonidol in 2% acetic acid showed, after development with the p-toluenesulfonic acid/vanillin reagent, a bright red well-defined spot of $Rf=0.50$, without any trials of lower $Rf$ (absence of polymers).

In butanol-acetic acid-water solvent (4/1/2.2) and using the same developer, its $Rf$ was 0.76.

What we claim is:

1. In a method for the preparation of pure crystallized flavanediols by direct reduction of flavanonols with sodium borohydride, the steps comprising, after reduction in alcoholic medium, taking up the reaction product in a saturated aqueous solution of sodium chloride, in neutral or slightly acetic acid medium, extracting of the solution thus obtained with a non-miscible solvent, so as to extract the corresponding flavanediol, adding to the non-miscible solvent extract sufficient water to form the hydrate of said flavanediol and precipitating said flavanediol with chloroform.

2. Method according to claim 1 in which the non-miscible solvent is ethyl acetate.

3. Method according to claim 1, in which the saturated solution of sodium chloride has a pH ranging from about 4 to 7.

4. Method according to claim 1 in which flavonanol used as starting material is taxifoliol.

5. Method according to claim 1 in which the flavanonol used as starting material is aromadendrol.

6. Method according to claim 1 in which the reducing agent is a member of the group consisting of potassium borohydride, and a metallic hydride.

7. Method for the preparation of tetrahydroxy-5,7,3′,4′ flavanediol-3,4 comprising the steps of direct reduction of tetrahydroxy-5,7,3′,4′ flavanonol-3 to tetrahydroxy-5,7,3′,4′ flavanediol-3,4 by means of sodium borohydride in an alcoholic mixture, evaporating the reaction mixture to dryness under reduced pressure after acidification taking up the residue in a saturated aqueous solution of sodium chloride, extracting the flavanediol formed with ethyl acetate, adding a quantity of water sufficient to form the flavanediol hydrate which is insoluble in said ethyl acetate and precipitating the flavanediol with a member of the group consisting of chloroform, benzene, petroleum ether, and hexane.

References Cited

Freudenberg et al. (I): Ann., vol. 613, pp. 61–75 (1958).

Freudenberg et al. (II): Angew Chem, vol. 70, p. 51 (1958).

Ganguly et al.: Tetrahedron, vol. 6, pp. 21–3 (1959).

Whalley: "The Stereochemistry of Flavonoid Compounds," pp. 456–9 of "The Chemistry of Flavonoid Compounds," Geissman (Ed), The Macmillan Co., pub., New York (1962).

JOHN M. FORD, Primary Examiner

U.S. Cl. X.R.

424—283